(12) United States Patent
Kabany

(10) Patent No.: US 11,385,083 B2
(45) Date of Patent: Jul. 12, 2022

(54) METHOD FOR MEASURING AND/OR PROCESSING MEASURED PRESSURE AND/OR HUMIDITY VALUES

(71) Applicant: Mohammad Kabany, Regensburg (DE)

(72) Inventor: Mohammad Kabany, Regensburg (DE)

(*) Notice: Subject to any disclaimer, the term of this patent is extended or adjusted under 35 U.S.C. 154(b) by 336 days.

(21) Appl. No.: 16/274,401

(22) Filed: Feb. 13, 2019

(65) Prior Publication Data

US 2020/0182660 A1 Jun. 11, 2020

(30) Foreign Application Priority Data

Dec. 7, 2018 (DE) .................... 10 2018 131 303.9
Dec. 7, 2018 (DE) .................... 10 2018 131 401.9

(51) Int. Cl.
*B60C 23/04* (2006.01)
*G01D 11/24* (2006.01)

(52) U.S. Cl.
CPC ........ *G01D 11/245* (2013.01); *B60C 23/0488* (2013.01); *B60C 23/0489* (2013.01)

(58) Field of Classification Search
CPC .. G01N 27/223; G01N 27/121; G01N 27/225; G01N 27/048; G01N 27/226; G01N 27/228; G01N 27/127; G01N 27/227; G01N 33/246; G01N 25/56; G01N 27/123; G01N 27/125; G01N 27/126; G01N 27/605; G01N 17/02; G01N 2027/222; G01N 2223/647; G01N 27/00; G01N 33/0006; G01N 15/065; G01N 17/04; G01N 19/10; G01N 2015/1481; G01N 21/4738; G01N 21/81; G01N 2201/00; G01N 2291/0253; G01N 2291/0255; G01N 2291/0256; G01N 2291/02845; G01N 22/04; G01N 25/64; G01N 25/66; G01N 27/046; G01N 27/07;
(Continued)

(56) References Cited

U.S. PATENT DOCUMENTS 5,283,711 A * 2/1994 Schmitz ............... G01N 27/225 361/286
8,161,826 B1 * 4/2012 Taylor ...................... G01L 1/18 73/862.044

(Continued)

FOREIGN PATENT DOCUMENTS

CN 110412487 A * 11/2019

*Primary Examiner* — Andre J Allen
(74) *Attorney, Agent, or Firm* — Michael J. Gallagher; Luper Neidenthal & Logan

(57) ABSTRACT

An apparatus and method for measuring pressure and/or humidity, having at least one sensor for measuring pressure and/or humidity. The sensor has at least one capacitor having at least two electrodes that are arranged in a horizontal direction relative to one another along and on a flexible support material. At least one dielectric layer is arranged between the electrodes. At least one at least partially moisture-permeable and/or moisture-absorbing layer is arranged in some places on a side, facing away from a support material, of the electrode and/or the dielectric layer. The at least one electrode and/or the dielectric layer are arranged transversely between the support material and the moisture layer. In this way, a capacitance is at least partially changed by moisture hitting the dielectric layer, and a processing unit is designed and provided to measure and/or store this change, so as to create a capacitive moisture sensor.

21 Claims, 1 Drawing Sheet

(58) Field of Classification Search
CPC .... G01N 27/122; G01N 27/128; G01N 27/14; G01N 27/22; G01N 27/221; G01N 27/30; G01N 27/4075; G01N 27/4077; G01N 27/4141; G01N 29/022; G01N 29/036; G01N 33/0011; G01N 33/0022; G01N 33/0027; G01N 33/0031; G01N 33/0036; G01N 33/0037; G01N 33/004; G01N 33/0042; G01N 33/0047; G01N 33/006; G01N 33/0062; G01N 33/18; G01N 33/24; G01N 33/383; G01N 33/46; G01N 5/025; G01N 7/00; H01L 2224/32145; H01L 2224/48091; H01L 2224/48247; H01L 2224/73265; H01L 2924/181; H01L 2924/00; H01L 2924/00012; H01L 2924/00014; H01L 21/283; H01L 21/311; H01L 21/52; H01L 21/56; H01L 2224/05554; H01L 2224/48145; H01L 2224/49171; H01L 2224/97; H01L 2225/06506; H01L 2225/0651; H01L 2225/06568; H01L 23/28; H01L 23/3171; H01L 23/3192; H01L 23/49513; H01L 23/60; H01L 25/0657; H01L 25/50; H01L 27/0248; H01L 28/60; H01L 2924/1815; H01L 29/402; H01L 29/4966; H01L 29/51; H01L 29/861; H01L 29/8618; H01L 33/56; H01L 49/00; G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

See application file for complete search history.

(56) References Cited

U.S. PATENT DOCUMENTS

| | | | | |
|---|---|---|---|---|
| 11,048,225 | B2 * | 6/2021 | Kabany | B60R 25/01 |
| 2004/0150499 | A1 * | 8/2004 | Kandler | B60C 23/0408 |
| | | | | 336/40 |
| 2004/0177685 | A1 * | 9/2004 | Yokura | G01N 27/225 |
| | | | | 73/335.04 |
| 2004/0194546 | A1 * | 10/2004 | Kanehori | G01N 27/225 |
| | | | | 73/335.04 |
| 2005/0156608 | A1 * | 7/2005 | Katz | G01N 27/223 |
| | | | | 324/658 |
| 2007/0251619 | A1 * | 11/2007 | Bertrand | B60C 23/064 |
| | | | | 152/152.1 |
| 2015/0068302 | A1 * | 3/2015 | Koo | G01N 27/22 |
| | | | | 73/335.04 |
| 2016/0178552 | A1 * | 6/2016 | Novac | G01N 27/223 |
| | | | | 73/335.04 |
| 2016/0202201 | A1 * | 7/2016 | Cobianu | G01N 27/223 |
| | | | | 73/335.04 |
| 2017/0247247 | A1 * | 8/2017 | Zhang | G01N 27/223 |
| 2019/0257779 | A1 * | 8/2019 | Nakane | G01N 27/048 |
| 2020/0025702 | A1 * | 1/2020 | Kabany | G01L 5/221 |
| 2020/0063297 | A1 * | 2/2020 | Kabany | A41D 1/002 |
| 2020/0072778 | A1 * | 3/2020 | Kravchenko | G01N 27/225 |
| 2020/0088589 | A1 * | 3/2020 | Kabany | G01L 1/142 |
| 2020/0158673 | A1 * | 5/2020 | Nakane | H01L 27/0248 |
| 2021/0181063 | A1 * | 6/2021 | Dodani | G01L 17/00 |

* cited by examiner

METHOD FOR MEASURING AND/OR PROCESSING MEASURED PRESSURE AND/OR HUMIDITY VALUES

CROSS-REFERENCE TO RELATED APPLICATIONS

This application claim priority to German patent application 10 2018 131 401.9, filed Dec. 7, 2018, which is incorporated as if fully rewritten herein.

STATEMENT REGARDING FEDERALLY SPONSORED RESEARCH OR DEVELOPMENT

Not applicable.

TECHNICAL FIELD

The present invention relates to a method and to a sensor system for measuring and/or processing measured pressure and/or moisture values, particularly to measuring and/or processing such values within a tire or tires.

BACKGROUND OF THE INVENTION

This specification teaches long-felt solution to numerous issues in the area of the measurement of pressure and/or humidity.

SUMMARY OF THE INVENTION

The invention is described below in more detail with reference to FIGS. 1 and 2. The present invention relates to a method and device for measuring and/or processing measured pressure and/or moisture values.

The method being proposed here comprises at least one sensor for measuring pressure and/or moisture. The sensor can be one based on a mechanical, thermoelectrical, resistive, piezoelectric, capacitive, inductive, optical and/or magnetic principle of operation.

For example, the sensor being proposed here can be a pressure and/or moisture sensor. In particular, the sensor can also be a tilt sensor, a force sensor, a CCD sensor, a photocell, a Hall sensor or a thermocouple.

Different principles of operation can also be combined so as to produce a sensor based, for example, on both capacitive principles of operation and an optical principle of operation.

According to at least one embodiment, the sensor system comprises at least one processing unit designed and provided for actuating the sensor and/or for storing and/or processing data measured by the sensor.

In addition, the sensor system comprises at least one analysis unit, which analyses the data relayed to it by the processing unit in order to then relay this data or a dataset generated from the data to a CPU, in particular wirelessly, the CPU being in particular a vehicle controller.

In this case, the CPU can be part of the sensor system.

According to the invention, at least the sensor, but preferably also the processing unit, is arranged on a flexible and bendable carrier material, the carrier material being designed and provided to be arranged on a surface of a usage object, in particular on the inner surface of a tire.

Specifically, previously known carrier materials, in particular those arranged within a tire, are not applied in a flexible or bendable manner, but rather in the form of an adhesive layer and/or a substrate. Now, however, it is proposed to provide a carrier material that specifically has flexible and bendable properties, instead of one that is inflexible and unbendable.

In this context, "flexible" means that the carrier material is bendable and thus resilient at least at some points.

The carrier material thus adapts to the shape of the inner surface of the tire. Preferably, the carrier material is arranged directly or indirectly on the inner surface of the tire. When arranged directly thereon, the carrier material is in direct contact with the tire rubber.

According to at least one embodiment, the method being proposed here for measuring and/or processing measured pressure and/or moisture values comprises at least one first step, by means of which at least one sensor for measuring pressure and/or moisture and at least one processing unit are provided, the sensor being designed and provided for actuating the sensor and/or for storing and/or processing data measured by the sensor.

In a further step, at least one analysis unit is provided, which analyzes the data relayed to it by the processing unit and then relays this data or a dataset generated from the data to a CPU, in particular wirelessly, wherein the CPU is in particular a vehicle controller, wherein at least the sensor, but preferably also the processing unit, is arranged on a flexible and bendable carrier material, wherein the carrier material is designed and provided to be arranged on a surface of a usage object, in particular on the inner surface of a tire.

According to at least one embodiment, the carrier material is a textile material, in particular a woven fabric.

Within the meaning of the invention, a woven fabric is therefore a fabric that has been woven manually or mechanically on the basis of individual threads.

By way of example, electrical conductor traces for electrically contacting the sensor and the processing unit are woven into the woven fabric. The electrical conductor traces can thus be integrated in the fabric in addition to the usual fibers and fabric strands, or can replace individual fabric strands that form the fabric mesh.

Therefore, these conductor traces can constitute an electrical connection between the sensor and the processing unit. The conductor traces can also form an electrical connection between a battery or another energy generation element between the sensor and/or the processing unit.

Depending on the distance between the individual threads and the properties thereof (twisted, baggy, etc.), it is possible to produce either very loose fabrics, such as bandage fabrics, or close fabrics, such as brocade fabrics, because fabrics are used in a longitudinally resilient manner by means of rubber threads (more bands) used as warp threads, or crinkled yarns and/or bulk yarns; they are warped, worked and contract when in the resting state. Bulk yarns consist of textured, i.e. crinkled, synthetic fibers. The crinkling alters the properties of the synthetic fibers. The yarns spun thereon are very resilient and voluminous and have good thermal insulation.

According to at least one embodiment, the carrier material is in the form of a carrier strip, such that the sensor and the processing unit are arranged one behind the other along the main strip length.

The length dimension and length direction of the carrier material that represent a main length direction form the "main strip length". Compared with the length of the carrier material in the direction of the main strip length, therefore, a width of the carrier material is negligible.

By way of example, a plurality of sensors are arranged one behind the other on the carrier material in the circumferential direction of the tire, each sensor separately measuring the pressure in the tire. Alternatively or additionally, at least one of the sensors the sensors arranged on the tire inner surface records and measures forces acting on the tire externally. For this purpose, the sensor can be capable, for example, of detecting and measuring elongation and/or compressive strain of the tire inner surface caused by external force applied to the exterior surface of the tire (e.g. the tread). For example, the carrier material can be extensible and/or flexible, in which case elongation and/or compressive strain of the carrier material enables conclusions to be drawn on the force acting on the exterior surface of the tire (force duration, force magnitude in newtons, etc.). For this purpose, the sensor can measure elongation and/or compressive strain of the tire inner surface and/or an internal air pressure that is changed by external force. From the elongation and/or compressive strain values of the tire inner surface, and/or from the changing internal pressure of the tire, the CPU in the device being claimed here can then determine a force value of the external force at a particular measurement time by means of algorithms stored accordingly in the CPU. However, it is also possible for at least one sensor. This measurement can be carried out simultaneously or with a time lag. For example, each sensor records a pressure value at the lowest and/or highest point of the tire in the direction of rotation. It is also conceivable for at least one sensor to record a pressure value in a rotational pattern of less than 10° and at most 30°, as long as the tire is in rotation.

Furthermore, the present invention relates to a sensor arrangement for measuring and/or processing measured pressure and/or moisture values.

The sensor arrangement being described comprises at least one sensor for measuring pressure and/or moisture, and at least one processing unit, which is designed and provided for actuating the sensor and/or for storing and/or processing data measured by the sensor.

At least the sensor, but preferably also the processing unit, is arranged on a flexible and bendable carrier material, the carrier material being designed and provided to be arranged on the surface of the one usage object, in particular on the inner surface of a tire.

The sensor arrangement being proposed here has the same advantageous designs and advantages as the sensor system described above.

The sensor system differs from the sensor arrangement in particular in that the sensor system additionally comprises the above-described CPU.

The present invention also relates to a monitoring system for measuring and/or processing measured pressure and/or moisture values within a tire, the monitoring system described here comprising an at least partially inflated tire, in particular a vehicle tire, and at least one sensor system according to at least one of the aforementioned embodiments, the carrier material being arranged on the inner surface of the tire, i.e. inside the tire.

By way of example, at least one of the sensors is arranged on the tire inner surface and measures forces acting on the tire externally. For this purpose, the sensor can be capable, for example, of detecting and measuring elongation and/or compressive strain of the tire inner surface caused by external force applied to the exterior surface of the tire. For example, the carrier material can be extensible and/or flexible, in which case elongation and/or compressive strain of the carrier material enables conclusions to be drawn on the force acting on the exterior surface of the tire (force duration, force magnitude in newtons, etc.).

The monitoring system being described here thus has the same advantages and advantageous designs as the sensor arrangement and sensor system described above.

Preferably, therefore, the tire is a pneumatic tire that is inflated pneumatically. For example, the tire is a vehicle tire.

According to at least one embodiment, the monitoring system comprises at least one tire valve that is part of the tire, the analysis unit being installed on or in the tire valve in an integrated manner.

In particular, the analysis unit can be installed in an integrated manner in a cover element or on a cover element of the tire valve, such that the analysis unit can be screwed onto the thread of a valve stem. The cover element can be, or can be part of, a valve cap of the valve, which cap can be attached to the valve stem.

In this embodiment, therefore, a valve stem of this kind thus already comprises the processing unit.

According to at least one embodiment, the monitoring system comprises at least two tires that can be or are mounted on a vehicle, at least one sensor arrangement according to at least one of the embodiments set out above being arranged in each of the two tires, and all the data being sent to the common CPU.

Preferably, the monitoring system comprises just one CPU that is responsible for all the arrangements.

According to at least one embodiment, the analysis unit sends to the CPU a rotational position of the sensor relative to a zero position of the tire.

The zero position can be an initial rotational position about the main rotational axis of the tire programmed beforehand into the CPU and/or into the analysis unit and/or processing unit. For example, the zero position can be a position at which the above-described tire valve reaches the highest height relative to a supporting base. The supporting base can be a road on which the tire can rotate about the axis.

According to at least one embodiment, each rotational position of each sensor is sent to the CPU such that the CPU continuously or intermittently records a position of the tires relative to one another and/or records a rotational angular speed, a rotational acceleration of each of the tires and/or a radial/axial force acting on each of the tires. Horizontal and/or vertical (shear) forces and tire air pressure can also be recorded.

For example, the measured information can be used as input information for stability control systems, ABS or transmission control systems for improving and/or protecting driving performance, in particular on corners.

In this respect, it is proposed by means of the CPU being proposed here and its preferably wireless communication with the individual analysis units preferably installed in the tire valves, which summarizes all the tires in a technical overview.

The sensor and/or the processing unit and/or the CPU can be supplied with electrical energy by means of a battery or a mains power supply.

Alternatively or additionally, electrical energy for powering the sensor and/or the processing unit can be generated by means of "energy harvesting".

Energy harvesting refers to the deriving of small amounts of electrical energy from sources such as ambient temperature, vibrations or air flows for low-power mobile equipment. The structures used for this are also referred to as nanogenerators. With wireless technology, energy harvesting avoids the limitations from wired power supplies or batteries.

Energy Harvesting Options:
- When force is applied to them, e.g. by pressure or vibrations, piezoelectric crystals generate electrical voltages. These crystals can be arranged at or on the carrier material;
- Thermoelectric generators and pyroelectric crystals derive electrical energy from temperature differences. These generators can be arranged at or on the carrier material;
- By means of antennae, the energy from radio waves, a form of electromagnetic radiation, can be collected and used for energy. Passive RFIDs are one example. These antennae can be arranged at or on the carrier material;
- Photovoltaics, electrical energy from environmental lighting;
- Osmosis.

For example, an energy storage and/or energy generation element of this kind is arranged on the carrier material in order to supply the sensor and/or processing unit with electrical energy.

An energy store of the device can be part of a processing unit. For this purpose, one or more of the processing units can comprise an energy store (local energy stores) of this kind. For example, just one or some of the processing units comprise an energy store of this kind, meaning that one of said processing units supplies electrical energy to a different processing unit (specifically one that has no energy store).

It is also conceivable for the energy storage unit(s) of the processing unit(s) to supply the CPU with electrical energy either in full or in part. For example, the CPU thus cannot be connected to any further energy store and/or energy supply lines.

By means of the aforementioned energy harvesting, at least one of the energy stores can be charged.

The energy can be transmitted between the sensors and/or the processing units and/or the CPU entirely or partly wirelessly.

Wireless near-field energy transmission, also referred to as non-radiating coupling, includes, for example, inductive coupling based on the magnetic flux. Often, the term "wireless energy transmission" is used synonymously for inductive energy transmission since the latter is dominant in practical applications. Wave phenomena are irrelevant in near-field non-radiating coupling.

For example, energy is transmitted wirelessly between the individual elements by means of inductive coupling, resonant inductive coupling and/or capacitive coupling.

By way of example, the sensor is constructed as follows and comprises at least one capacitor having at least two electrodes arranged relative to one another in particular in a horizontal direction along and on a, in particular the, in particular flexible carrier material, wherein at least one dielectric layer is arranged between the electrodes.

The sensor is characterized in that at least one at least partially liquid-permeable and/or liquid-absorbing moisture layer is arranged at least at some points on a side of at least one electrode and/or of the dielectric layer facing away from the carrier material, the at least one electrode and/or the dielectric layer thus being arranged in a transverse direction between the carrier material and the moisture layer such that a capacitance is changed at least in part by means of the liquid reaching at least part of the dielectric layer, a processing unit being designed and provided to measure and/or store this change, thereby producing a capacitive moisture sensor.

For example, two or more processing units within a tire and/or two or more processing units of different tires communicate with one another.

It is conceivable for the plurality of processing units to form a processing network, in which case the recording, processing and/or forwarding of the sensor data and/or processing data of each sensor and/or each processing unit is controlled by at least one control apparatus (master). The control unit can be identical to the above-described CPU.

It is also possible, however, for one or more of the processing units to constitute the master that controls the other processing units (slave) and/or the other sensors (slave).

For example, after the device has been commissioned (for example after the device has been connected), one of the processing units and/or the CPU can select sensors that have been put into operation for a predeterminable usage period. Alternatively, all or some of the sensors can also be put into operation, although then it is possible for a processing unit and/or the CPU to only relay data from a predetermined number of sensors (i.e. fewer than all the sensors) to the CPU (filtering), in particular for the purpose of saving energy.

This master processing unit can preferably communicate with the CPU as a single unit.

Alternatively or additionally again, it is possible for one or all of the processing units and/or a sensor (slave or master) to communicate directly with the CPU.

According to at least one embodiment, the processing network can be divided, by means of at least one VLAN switch, into at least two network segments (VLANs) that are separated from one another only logically, and each of the recording elements can be actuated depending on the actuation by a VLAN switch and/or the control apparatus and thus by each of the network segments.

If, for example, a very large surface area (for example a textile) is equipped with a plurality of sensors and processing units being claimed here, individual processing units and/or sensors can be categorized (by different priorities, etc.) in a particularly simple manner. In one embodiment, therefore, a "virtual" division, i.e. VLAN division, is selected instead of a physical network division. Specifically, this ensures that it is possible to react to changes in the categorization of the processing units and/or sensors particularly quickly and without complex redesign work.

According to at least one embodiment, the monitoring system comprises at least one processing network, said network being able to be divided, by means of at least one VLAN switch of the processing network, into at least two network segments (VLAN) that are separated from one another only logically, and each processing unit and/or each sensor being actuatable by each of the network segments depending on the actuation by the VLAN switch.

For this purpose, the VLAN switch can be installed in at least one of the processing units and/or sensors or in a separate component.

According to at least one embodiment, the individual network segments are prioritized, in particular in terms of their data exchange, by means of the VLAN switch.

According to at least one embodiment, each processing unit and/or each network segment is assigned at least one VLAN ID, wherein at least one sensor or a different processing unit can be actuated by means of each of the VLAN IDs. Individual sensors and/or individual processing units can form their own sub-network.

To communicate across network boundaries, static project-dynamic routes are used in the prior art. This separation model is clear and transparent and has been in use for years. However, it is disadvantageous in that broadcast requirements in the sub-network are visible for all subscribers and would need to be viewed from the terminal points. In other words, up to now different terminals could only be actuated by suitable separate switches assigned to each sub-network and physically separated from one another. However, a design of this kind is particularly expensive and elaborate.

Therefore, as mentioned above, each sub-network is in particular designed not having a separate switch and separate physical data lines, and so a single physical structure can be used for the entire network, said physical structure, i.e. network architecture, being divided only on the basis of a logical, in particular also mathematical (i.e. imaginary) distinction.

In this respect, the abbreviation "VLAN switch" refers to a network switch that is designed and provided for operating a network in the form of a virtual local area network (VLAN).

In this respect, therefore, the network segments now being claimed, which can each be in the form of a VLAN network, make it possible to divide the separation of the network into a plurality of logical segments, i.e. the network segments.

Unlike in the case of physical separation by assignment to a switch port, the devices are separated logically by a VLAN ID when separated using VLANs. In the process, the data flow of each station is provided with an identifier (the VLAN "tag"). This identifier defines the particular VLAN to which a data packet belongs. All the devices having the same VLAN identifier are now located in one logical network.

In particular, by logically separating the individual networks, it is possible specifically to restrict a broadcast. In other words, broadcasts are only distributed to members of the same VLAN and not to all the control elements attached to the switch.

This not only helps achieve higher performance, but also greater security since the data traffic is limited to fewer addressees. In addition, in a VLAN users or the control elements are generally unable to break out of the allocated VLAN. The network switch can therefore prevent access to (or an attack on) another computer not belonging to the particular VLAN. If communication beyond a VLAN is required, routes can be explicitly set up for this purpose.

It should be noted in particular that the VLAN technology being described here can be one that complies with and/or is compatible with the industry standard IEEE 802.1Q.

The IEEE 802.1Q standard is a prioritization and VLAN technology that is standardized by the IEEE and implements packet-based tagged VLANs in contrast to the older, solely port-based VLANs. The expression "tagged" is derived from the term "material tags."

Tagged VLANs are therefore networks that use network packets carrying a special VLAN marker.

In particular, the 802.1Q standard specifically defines data fields for the VLAN tagging that can be input in the data area of an Ethernet packet.

In this respect, the present network can be in the form of an Ethernet communications system.

This is advantageous in that, in general, existing older switches can also relay packets of this kind. The inserted tag is generally composed of a plurality of fields, for example four fields having a total length of 32 bits.

2 bytes are used for the protocol ID, 3 bits for the priorities field, 1 bit for the indicator of the canonical form and 12 bits for the VLAN ID.

To clearly identify a VLAN, therefore, each VLAN is initially assigned a unique number. This number is called the VLAN ID. A recognition module equipped with the VLAN ID=1 can communicate with any other device in the same VLAN, but not with a device in another VLAN, e.g. ID=2, 3, etc.

To distinguish between the VLANs, an Ethernet frame is expanded by 4 bytes in accordance with the IEEE 802.1Q standard. Of these, 12 bits are intended for recording the VLAN ID, and so 4096−2=4094 VLANs are theoretically possible (without utilizing the canonical form).

It is conceivable for the individual logical network connections to be formed in accordance with an OPC standard, e.g. in the form of OPC UA connections. Specifically, it is conceivable in particular for a plurality of OPC UA terminal points having different IP addresses, VLAN IDs and prioritization to be available per network segment via the control apparatus in accordance with the aforementioned IEEE 802.1Q standard.

If a network segment that has been uniquely, preferably unambiguously, allocated a particular VLAN ID now has a higher priority than a network segment, which differs therefrom only in logical terms, of an accordingly different VLAN ID, the control apparatus and/or the VLAN switch can be intended to initially prefer data exchange of the higher-priority network segment so as to allow the execution of the lower-priority network segment only after the elimination of the tasks associated with said higher-priority network segment.

In other words: in general, the OPC UA terminal points are configured and assigned to a particular network segment in accordance with the VLAN ID, and a priority is assigned in accordance with the priority of the corresponding VLAN.

According to at least one embodiment, each sensor and/or each processing unit is assigned at least one VLAN ID and each network segment is in turn assigned at least one, for example precisely one, unique, preferably unambiguous, VLAN ID, wherein at least one control element can be actuated by each VLAN ID. According to at least one embodiment, at least one device comprises at least one temperature sensor, the temperature sensor measuring an ambient temperature and/or a temperature of a sensor and relaying this/these to the processing unit of a device and/or to the central CPU.

According to at least one embodiment, the central CPU determines a utilization level (CPU load and/or storage consumption) of at least one processing unit, and when a limit temperature of the processing unit and/or at least of the sensor assigned to said processing unit is exceeded, the power of said unit or sensor is throttled at least in part or switched off entirely.

In addition, it is also conceivable, additionally or alternatively, for the processing unit(s) to both communicate with one another and be wired in the same way as the processing unit in the context of the above network.

BRIEF DESCRIPTION OF THE ILLUSTRATIONS

Without limiting the scope of the as disclosed herein and referring now to the drawings and figures.

Figure 1:
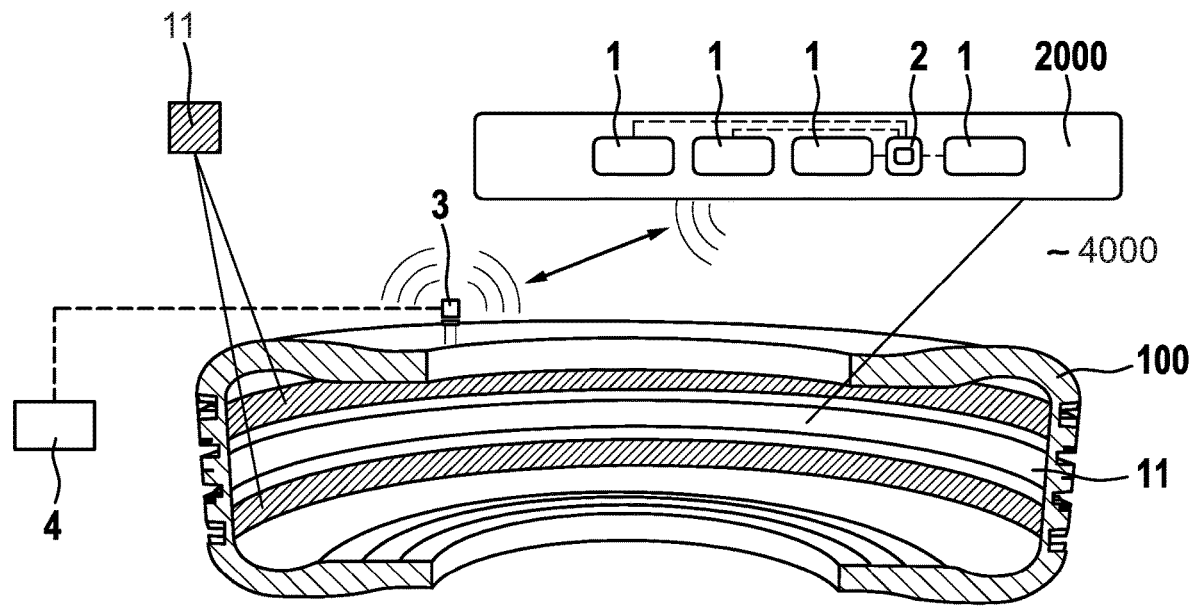
FIG. 1 is a sectional view of an embodiment of a tire being proposed here, within which the arrangements proposed in this application are arranged.

These illustrations are provided to assist in the understanding of the exemplary embodiments of a method and device for measuring and/or processing measured pressure and/or moisture values and materials related thereto described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

The invention will be described in more detail below on the basis of an embodiment and the associated drawings.

DETAILED DESCRIPTION OF THE INVENTION

Identical components or those having the same function are provided with the same reference numerals, even if some reference numerals or components are shown excessively large.

As mentioned above, FIG. 1 is a sectional view of a tire 100 being proposed here, a sensor system 2000 for measuring and/or processing pressure and/or moisture values being shown within the tire 100.

It can be seen that the sensor arrangement 2000 comprises a plurality of sensors 1 for measuring pressure and/or moisture; for these sensors 1, preferably just one processing unit 2 is provided, which is designed and provided for actuating the sensors 1 and/or for storing and/or processing data measured by the sensors 1.

Both the sensors 1 and the processing unit 2 are arranged on a flexible carrier material 11, the carrier material 11 being designed and provided to be arranged on the surface of a usage object, so in this case on an inner surface of the tire 100.

Along the inner surface of the tire 100, i.e. parallel to the circumferential direction of the tire 100 on the inner surface of the tire 100, the carrier material 11 is formed as a carrier strip, such that the sensors 1 and the processing unit 2 are arranged one behind the other along the main strip length.

In FIG. 1, the carrier strip on which the sensors 1 and processing unit 2 are arranged forms a center strip, which to its left and right by further optional carrier strips that can be formed in the same manner as the central carrier strip.

It is also shown that a further optional carrier strip can be arranged on an inner surface of the side wall of the tire 100. This carrier strip can also be constructed in the same manner as described above. By way of example, it is possible for just one single carrier strip to be arranged inside the tire 100 on an inner surface of the tire 100.

The sensor arrangement 2000 comprises a CPU 4 outside the tire 100, for example inside the vehicle, said CPU in particular being provided as a vehicle controller that receives and processes data from at least one analysis unit 3, in particular wirelessly.

By way of example, on the basis of the data processing, the CPU 4 can establish whether an internal pressure of the tire is sufficient or whether wear to the tire 100 is likely on the basis of the elapsed usage time of the tire 100. It is also conceivable for the data to either include or consist solely of data that is caused by external forces acting on the tire externally. In particular, on the basis of the elapsed usage period, the CPU 4 can calculate, on the basis of the data generated and supplied by the analysis unit 3, whether a predetermined maximum load period of the tire 100 has passed. This maximum load period can result, for example, from an aforementioned elapsed period according to the data in terms of a rotational angular speed and a rotational acceleration of the tire 100 and/or from forces acting on the tire 100.

A particular number of maximum rotational angular speeds and/or rotational accelerations or radial forces acting on the tire 100 based on a predetermined usage period can be stored in the CPU 4 beforehand. If this number is exceeded, the CPU 4 can indicate to the vehicle user that a tire 100 needs changing and/or that the tire 100 needs refilling with compressed air.

Figure 2:
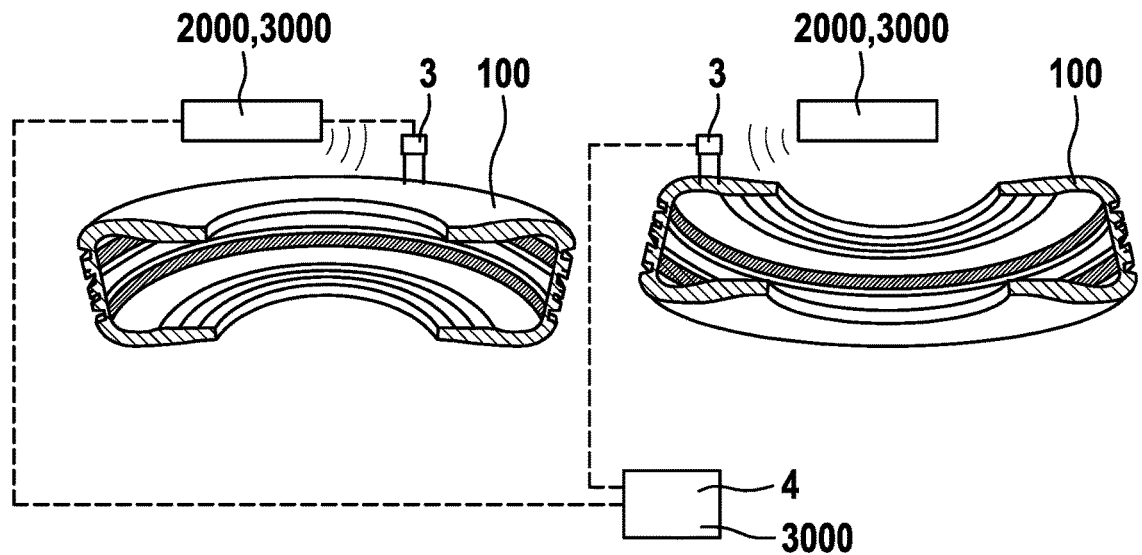
FIG. 2 shows two tires that can be mounted on a vehicle and are in data communication with one another via the common CPU.

In addition, FIG. 2 simultaneously shows a monitoring system 3000, which in this case is installed in two tires 100 that are in data communication with one another by means of a common CPU 4.

A sensor arrangement 2000 as described above is installed within each tire 100.

In the process, it is also possible to derive from FIG. 1 a method 4000 for measuring and/or processing measured pressure and/or moisture values, the method 4000 being able to be carried out in particular on the basis of the above-described monitoring system 3000 and/or the above-described sensor arrangement 2000.

The applicant reserves the right to claim all the features disclosed in the application documents as being essential to the invention wherever they are novel over the prior art when taken in isolation or in combination.

LIST OF REFERENCE NUMERALS

1 Sensors
2 Processing unit
3 Analysis unit
4 CPU
11 Carrier material
100 tire
2000 Sensor arrangement
3000 Monitoring system
4000 Method

I claim:

1. A system (4000) for measuring and processing measured ambient conditions within a usage object, comprising:
    at least one sensor (1) selected from the group of sensors consisting of a pressure sensor and a moisture sensor, wherein, the sensor (1) has at least one further capacitor (30) which is arranged in the transverse direction (Q1) above or below the capacitor (20) and is arranged spaced apart from the capacitor (20) by a further water-impermeable layer (15) on or below this further water-impermeable layer (15), so that a capacitor stack is formed, and further wherein both capacitors (20, 30) are constructed in the same way and both capacitors (20, 30) perform the same tasks,
    at least one processing unit (2), which actuates the sensor (1) and/or stores and/or processes data measured by the sensor (1),
    at least one analysis unit (3), which analyses the data relayed to it by the processing unit (2) and then wirelessly relays this data to a central processing unit CPU (4), wherein
    the sensor (1) and the processing unit (2) are arranged on a flexible and bendable carrier material (11), that is arranged on a surface of the usage object.

2. The method according to claim 1, wherein the CPU is at least part of a vehicle controller.

3. The method according to claim 1, wherein the surface of the usage object is the inner surface of a tire (100).

4. The method according to claim 1, wherein the carrier material (11) is a woven fabric.

5. The system according to claim 1, wherein the carrier material (11) is in the form of a carrier strip, and the sensor (1) and the processing unit (2) are arranged one behind the other along a main strip length.

6. A method for measuring and processing measured ambient conditions within a usage object, comprising the steps of:
1. providing at least one partially inflated tire (100) as the usage object;
2. providing at least one sensor system (2000) including at least a sensor (1) measuring at least one parameter of the parameters selected from the group of parameters consisting of pressure and moisture, and processing unit (2);
3. arranging a carrier material (11) on the surface of the usage object, such that the carrier material is arranged on the inner surface of a tire (100),
4. arranging at least the sensor (1) and processing unit (2) on the carrier material (11),
5 activating the sensor (1) by means of the processing unit (2),
6. at least transiently storing and processing data gathered by the sensor (1) in the processing unit (2),
7. transmitting data from the processing unit (2) to the analysis unit (3),
8. analyzing data received from the processing unit in the analysis unit (3), and
9. wirelessly transmitting analyzed data from the analysis unit (3) to the CPU (4).

7. The system according to claim 1, wherein the usage object is at least one tire (100).

8. The system according to claim 7, wherein the at least one tire is at least two tires (100) mounted on a vehicle, wherein at least one sensor (1) is included in each of the two tires (100), and all data being sent to a common CPU (4).

9. The system according to claim 7, wherein the analysis unit (3) sends a rotational position of the sensor (1) relative to a zero position of the tire (100) to the CPU (4).

10. The method according to claim 7, wherein the analysis unit (3) sends a rotational position of each sensor (1) relative to a zero position of each tire (100) to the CPU (4), and the CPU (4) at least intermittently records a position of each tire (100) relative to one another, and at least transiently records at least one parameter selected from the parameters consisting of a rotational angular speed of the tire (100), a rotational acceleration of the tire (100) and a radial force acting on the tires (100).

11. A sensor system (2000) for measuring and/or processing measured pressure and/or moisture values, comprising
at least one sensor (1) for measuring pressure and/or moisture,
at least one processing unit (2), actuating the sensor (1) and for at least transiently storing and processing data measured by the sensor (1), wherein
the sensor (1) and the processing unit (2) are arranged on a flexible and bendable carrier material (11), the carrier material (11) being designed and provided to be arranged on the surface of a usage object.

12. The system according to claim 11, wherein the surface of a usage object is the inner surface of a tire (100).

13. The system according to claim 11, wherein the carrier material (11) is a woven fabric.

14. The system according to claim 11, wherein the carrier material (11) is in the form of a carrier strip, such that the sensor (1) and the processing unit (2) are arranged one behind the other along the main strip length.

15. A monitoring system (3000) for measuring and processing ambient condition within a usage object, comprising:
at least one sensor (1) for measuring pressure and/or moisture,
at least one processing unit (2), which actuates the sensor (1) and/or stores and/or processes data measured by the sensor (1),
at least one analysis unit (3), which analyses the data relayed to it by the processing unit (2) and then wirelessly relays this data or a dataset generated from the data to a CPU (4), wherein
the sensor (1) has at least one further capacitor (30) which is arranged in the transverse direction (Q1) above or below the capacitor (20) and is arranged spaced apart from the capacitor (20) by a further water-impermeable layer (15) on or below this further water-impermeable layer (15), so that a capacitor stack is formed, and further wherein both capacitors (20, 30) are constructed in the same way and both capacitors (20, 30) perform the same tasks, and the processing unit (2) are arranged on a flexible and bendable carrier material (11), the carrier material (11) being arranged on the inner surface of at least usage object.

16. The system according to claim 15, wherein the usage object is at least one tire (100).

17. The system according to claim 16, further comprising at least one tire valve that is part of the tire (100), wherein the analysis unit (3) is installed in an integrated manner as part of the tire valve.

18. The system according to claim 8, wherein the at least one tire (100) further comprises at least two tires (100) mounted on a vehicle, wherein each tire has at least one sensor arrangement (2000) arranged in each of the two tires (100), and all collected data is transmitted to a common CPU (4).

19. The system according to claim 8, wherein the analysis unit (3) transmits at least one rotational position of the sensor (1) relative to a zero position of the tire (100) to the CPU (4).

20. The system according to claim 19, wherein the at least one rotational position of the sensor (1) is a plurality of rotational positions of the sensor (1), and each rotational position of each sensor (1) is sent to the CPU (4) wherein the CPU (4) at least intermittently records a position of each tire (100) relative to one another and at least transiently records at least one parameter selected from the group of parameters consisting of a rotational angular speed of the tire, a rotational acceleration of the tire (100) and a radial force acting on the tire (100).

21. The measurement and processing system according to claim 1, wherein the measuring system (1000) comprises at least two sensors (1), wherein by the processing unit (5) the sensors (1) are divided into groups of at least one sensor (1) based on at least one of the following criteria:
(a) Arrangement location of the sensor (1) or sensors (1) on the carrier material (13), wherein the carrier material (13) is divided into area regions, and within an area region only sensors (1) of one group are arranged.

* * * * *